March 6, 1956  D. W. HOSTETTER  2,736,983
AERATED MINNOW BUCKET
Filed Dec. 1, 1953  2 Sheets-Sheet 1
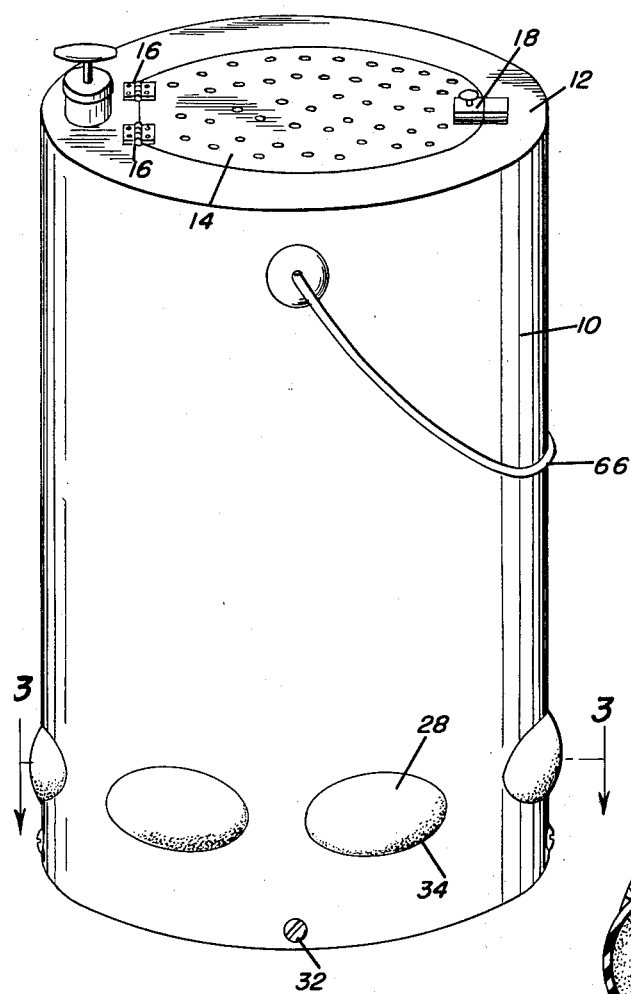
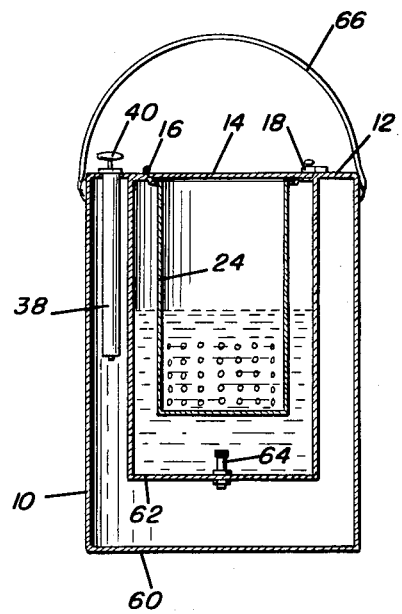
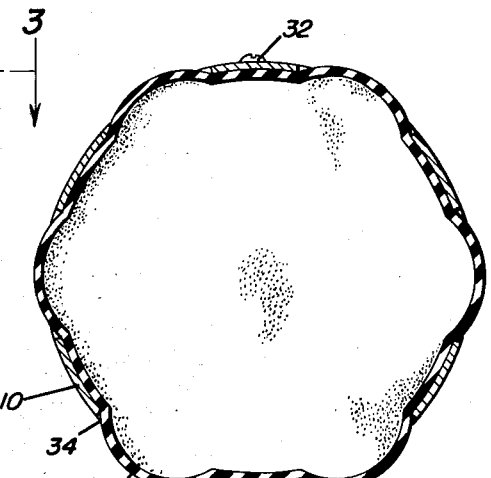
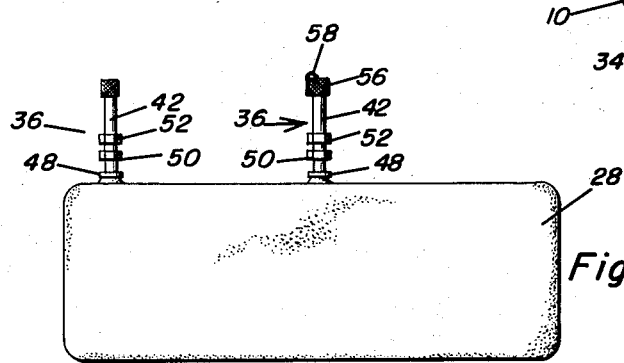
Donald W. Hostetter
INVENTOR.

March 6, 1956 D. W. HOSTETTER 2,736,983
AERATED MINNOW BUCKET
Filed Dec. 1, 1953 2 Sheets-Sheet 2
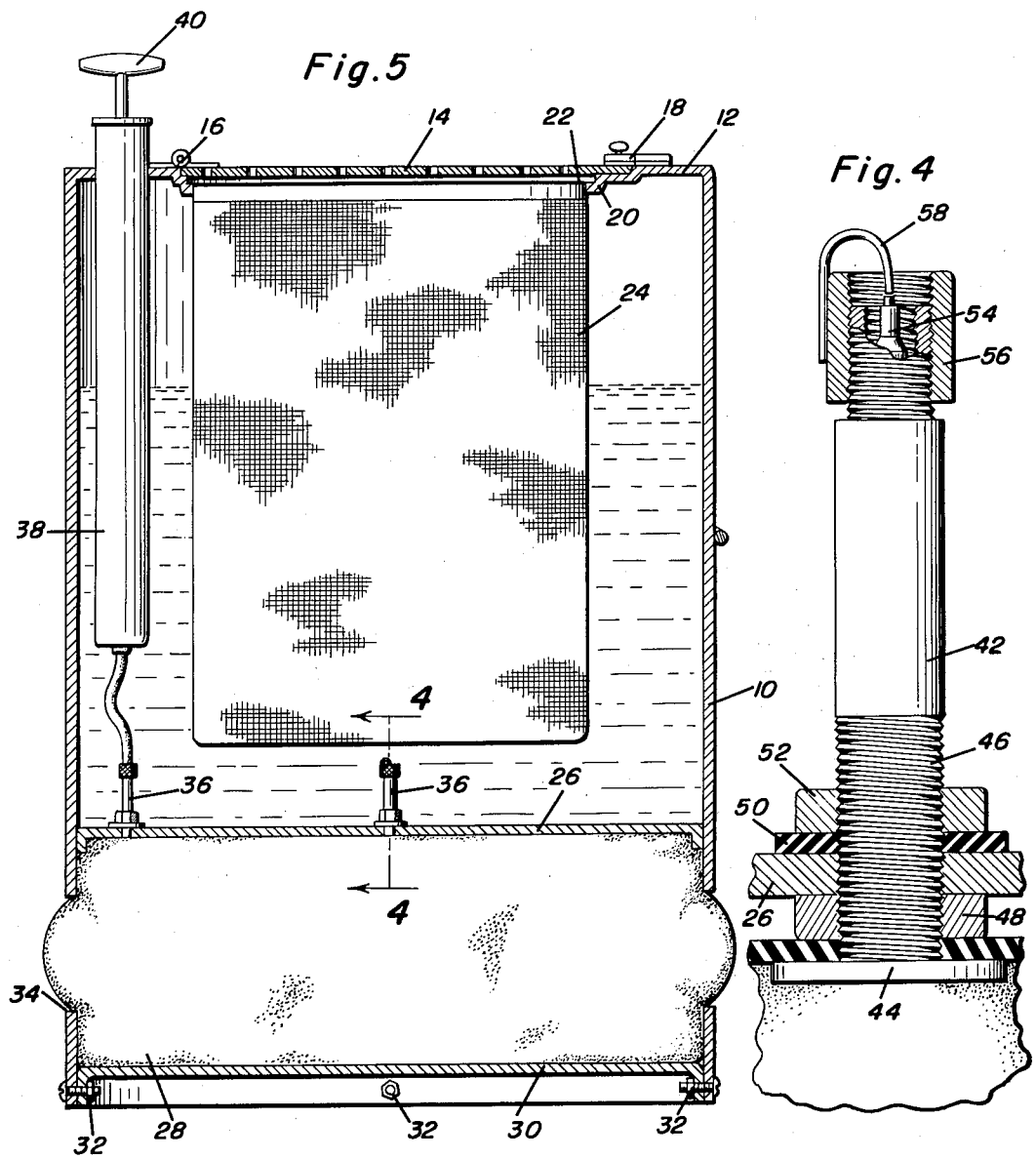
Donald W. Hostetter
INVENTOR.

United States Patent Office 2,736,983
Patented Mar. 6, 1956

2,736,983

AERATED MINNOW BUCKET

Donald W. Hostetter, Emporia, Kans.

Application December 1, 1953, Serial No. 395,501

4 Claims. (Cl. 43—57)

This invention relates to an aerated minnow bucket and more particularly to a device which is useful for prolonging the life of minows or other live fishing bait in the water of a bucket.

An object of this invention is to provide a minnow bucket wherein air may be released on the bottom of the bucket to bubble up through the water in the bucket to replace oxygen that the live baits take from the water.

Another object of this invention is to provide a minnow bucket wherein air is released from the bottom of the bucket to cause the water to circulate to the top of the bucket thereby exposing the water to more oxygen supply which will aid in the replenishing of the oxygen in the water.

A further object of this invention is to provide a novel means in the bottom of a minnow bucket for storing air to be released upwardly through the water in the minnow bucket.

A still further object of this invention is to provide an aerated minnow bucket which is simple and efficient in construction and durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing a preferred form of aerated minnow bucket forming the subject of this invention;

Figure 2 is a plan view showing the air supply retainer in the embodiment shown in Figure 1;

Figure 3 is a sectional view taken substantially along the section line 3—3 of Figure 1;

Figure 4 is a sectional view taken substantially along the section line 4—4 of Figure 5;

Figure 5 is a vertical sectional view of the minnow bucket shown in Figure 1; and Figure 6 is a vertical sectional view of a modified form of minnow bucket conforming to the subject of this invention.

Referring now more specifically to the accompanying drawings it will be seen that the improved form of aerated minnow bucket forming the subject of this invention includes, as shown in Figure 1, an outer housing 10 having an inwardly extending flange 12 integral with the top thereof. The central opening in the flange 12 is closed by means of a perforated cover 14 secured thereto by means of hinges 16. Diametrically opposite the hinges 16 there is provided a latch means 18 for securing the cover in closed position. The inner edge of the flange 12 is provided an offset portion 20 upon which rests the upper flange 22 of a standard perforated bucket 24. The bucket 24 is for containing the live bait therein. A partition 26 is secured to the inner surface of the housing 10 and is sealed thereto. The partition 26 is positioned so as to be spaced from the bottom of the bucket 24 when the bucket 24 is in position within the housing 10. An inflatable bag 28 is disposed within the housing 10 on the side of partition 26 opposite the side adjacent the bottom of bucket 24.

A plate 30 is secured within the housing 10 at the end opposite the flanges 12 by means of fasteners 32. The plate 30 retains the inflatable bag 28 in position in the housing 10. The housing 10 is provided with a plurality of openings 34 in the wall thereof in the portion between the partition 26 and the plate 30. These openings allow the inflatable bag to be distended therethrough so that the user of the bucket may ascertain at any time what the air pressure is within the inflatable bag 28.

The inflatable bag is provided with a pair of conventional tire valves 36 extending upwardly therefrom and which extend through openings in the partition 26. The valves are sealed against the partition 26 to prevent leakage of water therethrough. One of the valves is connected to a conventional tire pump 38 which is mounted within the bucket and extends upwardly through the flange 12. The pump 38 is provided with the conventional hand operated plunger 40. Thus, when the plunger 40 is actuated the inflatable bag 28 will be filled with a supply of air.

The valves 36 may be conveniently formed as follows: A valve stem 42 is provided with a flange 44 at one end thereof. The flange 44 is adapted to be inserted through an opening in the inflatable bag 28. The outer surface of the valve stem 42 is threaded at the end adjacent the flange 44 as indicated by 46. A first nut 48 is disposed on the threaded portion 46 and clamps the edges of the inflatable bag surrounding the opening between the flange 44 and the nut 48. Then the valve stem 42 is inserted through an opening in the partition 26 and a resilient washer 50 is disposed on the valve stem above the partition 26 and a nut 52 engages the threaded portion 46 and clamps the resilient washer 50 against the partition 26 to seal the opening through the partition 26. The other end of the valve stem 42 is threaded both internally and externally. A spring pressed valve, of conventional structure, indicated generally by 54 is threadedly engaged within the valve stem 42. A collar 56 is threadably engaged in the outer threaded portion of valve stem 42 and the collar 56 is provided with a U-shaped member 58 secured thereto and extending internally of the collar 56 to engage the valve 54. Thus, by turning the collar 56 on the threaded portion of valve stem 42 the position of the valve 54 can be adjusted to regulate the flow of air through the valve stem 42. The collar 56 is mounted only on the valve 36 not connected to the pump 38.

In practical use of the device illustrated by Figures 1 through 5 the pump plunger 40 is actuated to supply air under pressure to the inflatable bag 28. After the bucket has been filled with water the collar 56 is adjusted to regulate the escape of air from the inflatable bag 28 into the main compartment of the bucket. The perforated container 24 is then placed in position in the bucket and live baits are placed in the perforated container. As the air passes upwardly through the water it increases the supply of oxygen within the water to keep the baits alive until they are ready to be used for fishing purposes.

In the embodiment shown in Figure 6, the housing 10 is formed with a closed bottom 60. An inner casing 62 also having a closed bottom is disposed within the outer housing 10 and is fixed at its upper end to the flange 12. The construction of cover 14 and bucket 24 is of a similar nature to that disclosed in Figures 1 through 5 and the bucket 24 is positioned within the inner housing 62. The pump 38 is mounted in the same position but is not connected to an inflatable bag. The pump 38 merely supplies air to the compartment formed between the outer housing 10 and the inner casing 62.

The bottom wall of the inner casing 62 is provided with a valve 64 similar to valve 36 and having a collar thereon similar to collar 56.

In practical use of the embodiment shown in Figure 6, air is supplied under pressure to the compartment between the outer housing 10 and inner casing 62 and is allowed to escape through the valve 64 through water placed in the inner casing 62. The flow of the air from the compartment is regulated the same as it was in Figure 1.

A conventional carrying handle 66 may be secured to the bucket for transporting the same.

Referring again to Figures 1 through 5 it will be noted that the openings 34 serve an additional function to that mentioned above. As the air is released from the bag 28, the portions of the bag 28 extending through the openings 34 will contract. This contraction will cause the bag 28 to exert a squeezing effect on the air within the bag to maintain the pressure constant for a prolonged period of time.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An aerated minnow bucket comprising an outer housing, a perforated container secured within said housing and extending from one end thereof, a partition in said housing and sealed to the walls thereof, said partition being spaced from the inner end of said container, a plate removably secured to the other end of said housing and forming a chamber in said housing between said partition and said plate, means disposed in said chamber for storing a supply of air under pressure, means disposed in said housing adjacent said perforated container for supplying air under pressure to said first named means, and means extending through said partition and connected to said first named means for releasing the air under pressure into said housing through the perforated bottom of said perforated container, said first named means comprising an inflatable bag, said second means comprising a hand operated pump having the discharge end thereof connected to said inflatable bag.

2. An aerated minnow bucket comprising an outer housing, a perforated container secured within said housing and extending from one end thereof, a partition in said housing and sealed to the walls thereof, said partition being spaced from the inner end of said container, a plate removably secured to the other end of said housing and forming a chamber in said housing between said partition and said plate, means disposed in said chamber for storing a supply of air under pressure, means disposed in said housing adjacent said perforated container for supplying air under pressure to said first named means, and means extending through said partition and connected to said first named means for releasing the air under pressure into said housing around said perforated container, said first named means comprising an inflatable bag, said second means comprising a hand operated pump having the discharge end thereof connected to said inflatable bag, said third named means comprising a valve stem secured to said inflatable bag, a spring pressed valve in said valve stem and a valve operator secured to said valve stem, said operator being adjustable to vary the position of said spring pressed valve to control the escape of air from said inflatable bag.

3. The combination of claim 1 wherein said housing is provided with a plurality of apertures in the portion thereof which forms the chamber for the inflatable bag whereby said inflatable bag may be distended through said apertures.

4. An aerated minnow bucket comprising an outer housing, first means in said housing for storing a supply of air under pressure, second means in said housing for supply air under pressure to said first means, third means in said housing having a supply of water therein, a tubular member connected to said first means for passing air from said first means to said third means, a self-closing valve in said tubular member variably settable inwardly thereof to variably open said tubular member, a tubular sleeve threaded on said tubular member for screw feed thereon while leaving said tubular member open, and a U-shaped member on said sleeve extending into said tubular member and adapted to engage said valve to set said valve upon screw feed of said sleeve.

References Cited in the file of this patent

UNITED STATES PATENTS

| | | |
|---|---|---|
| 750,143 | Wilson et al. | Jan. 19, 1904 |
| 1,568,730 | Gleason | Jan. 5, 1926 |
| 1,604,971 | Churchill et al. | Nov. 2, 1926 |
| 1,731,921 | Coleman et al. | Oct. 15, 1929 |
| 2,483,561 | Rauh | Oct. 4, 1949 |